United States Patent
Boles et al.

(10) Patent No.: US 7,123,675 B2
(45) Date of Patent: Oct. 17, 2006

(54) CLOCK, DATA AND TIME RECOVERY USING BIT-RESOLVED TIMING REGISTERS

(75) Inventors: Glenn M Boles, Fords, NJ (US); Alfred Earl Dunlop, Kattskill Bay, NY (US); Ilija Hadzic, Millington, NJ (US); Manyalibo Joseph Matthews, Jersey City, NJ (US); Dusan Suvakovic, Florham Park, NJ (US); Doutje T. Van Veen, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 740 days.

(21) Appl. No.: 10/255,008

(22) Filed: Sep. 25, 2002

(65) Prior Publication Data

US 2004/0057539 A1 Mar. 25, 2004

(51) Int. Cl.
*H04L 7/00* (2006.01)

(52) U.S. Cl. ............... 375/354; 327/141; 370/503; 709/248; 714/12

(58) Field of Classification Search ............... 375/354; 327/141; 370/503; 709/240; 714/12
See application file for complete search history.

(56) References Cited

U.S. PATENT DOCUMENTS

| | | | |
|---|---|---|---|
| 4,392,234 A | 7/1983 | Maruta | 375/118 |
| 4,393,279 A | 7/1983 | Cochrane et al. | 179/175.31 R |
| 4,823,365 A | 4/1989 | Loginov | 375/118 |
| 4,845,709 A * | 7/1989 | Matsumoto et al. | 370/452 |
| 4,928,275 A | 5/1990 | Moore et al. | 370/102 |
| 5,077,761 A | 12/1991 | Tokunaga | 375/118 |
| 5,237,290 A | 8/1993 | Banu et al. | 331/2 |
| 5,255,293 A | 10/1993 | Archer et al. | 375/118 |
| 5,272,728 A | 12/1993 | Ogawa | 375/110 |
| 5,274,681 A | 12/1993 | Yamada et al. | 375/118 |
| 5,402,425 A | 3/1995 | Bladh | 370/105.3 |
| 5,598,555 A * | 1/1997 | Ito | 713/502 |
| 2001/0007136 A1* | 7/2001 | Tamura et al. | 713/500 |
| 2002/0196883 A1* | 12/2002 | Best et al. | 375/355 |

* cited by examiner

*Primary Examiner*—Jean B. Corrielus
*Assistant Examiner*—Erin M. File
(74) *Attorney, Agent, or Firm*—Donald P. Dinella

(57) ABSTRACT

A clock recovery method is disclosed wherein the FIFO delay of data words and the phase difference between a data word and a receiver clock are used to time data transmissions from a transmitter. The phase difference between the data word and the receiver clock is determined by the offset of a word relative to a desired position in a storage buffer. The FIFO delay is determined either by measuring the difference between a read pointer and a write pointer in the FIFO or, alternatively, by calculating the difference between a timestamp of the time a data word entered the FIFO and the current time as the data word is read from the FIFO.

10 Claims, 6 Drawing Sheets

CLOCK, DATA AND TIME RECOVERY USING BIT-RESOLVED TIMING REGISTERS

FIELD OF THE INVENTION

The present invention relates to digital transmission networks and, more specifically, to enhancing the efficiency of data transmission in such networks.

BACKGROUND OF THE INVENTION

There are numerous manners in which to transfer data from a transmitter to a receiver. In a typical system for transferring data, a transmitter has clock circuitry that controls the speed at which data are transferred via a communications medium. A receiver in such a system also typically has clock circuitry that controls the speed at which the data that are received from the communications medium is processed.

Ideally, the receiver's clock and the transmitter's clock will operate at exactly the same frequency and will be appropriately aligned in phase. However, the clock used by the transmitter is typically different in phase and slightly different in frequency as compared to that of the receiver. Further, the data may be variably delayed through the transmission medium as well as through the receiver circuitry. For the case of transmission systems in which several transmitters are transmitting to one or more receivers (for instance, over a time-division multiplexed network), the receivers must recover each transmitter's clock and data, and therefore the receiver circuitry must be able to respond to any number of different phases and perhaps slightly different frequencies within a specified tolerance. Such a system in which data traveling along the transmission medium contains time-division-multiplexed "bursts" of data originating from transmitters with nearly the same clock frequency and no phase alignment is henceforth referred to as a "burst-mode" transmission system.

The efficiency of burst-mode systems is characterized by the ratio of a) the time in the data stream occupied by the readable component of the data bursts, to b) the "unused" time in the transmission line comprised of inter-burst time gaps. To increase the efficiency of any burst-mode system, one seeks to reduce the time overhead introduced by the receiver circuitry and to minimize these inter-burst time gaps. In order to achieve the latter, all sources of delays in the transmission system must be accurately characterized and controlled. For instance, the use of elastic buffers in burst-mode clock and data recovery circuits, such as first-in-first-out buffers (FIFOs), introduces timing delays that prevent the efficient control and minimization of inter-burst time gaps. One method of addressing these efficiency and gap minimization problems is to measure the time delay and phase differences between the clock at the transmitter and the clock at the receiver. However, in order to measure this timing delay, it is necessary to know the characteristics of the clock at the transmitter, which is usually remote from the receiver. Therefore, some method of recovering the transmitter clock characteristics and associating those characteristics with the receiver clock and a particular data transmission is required.

Generally, in non-burst mode transmission systems such recovery, known as clock and data recovery (CDR), can easily be achieved by either standard open-loop or closed-loop clock recovery systems. Examples of these systems, which are well known in the art, are described in I. Dorros et al., An Experimental 224 Mb/s Digital Repeated Line, The Bell System Technical Journal, Vol. 45, No. 7, pp. 993–1043 (September 1966) and R. R. Cordell et al. in A 50 Mhz Phase- and Frequency-Locked Loop, IEEE Journal of Solid State Circuits, Vol. SC-14, No. 6, pp 1003–1010 (December 1979), respectively. Open-loop systems are characterized by a narrow bandpass filter (e.g., a SAW filter), while closed-loop systems typically contain a simple phase-locked loop, which attempts to lock onto the phase of the incoming signal. While such methods sufficiently recover clock and data for continuous or pseudo-bursty data, they are ineffective at CDR in burst mode systems. More recently, cost-effective methods and apparatus for recovering the phase of a signal in a burst-mode transmission system have been developed that avoid many of the deficiencies associated with prior apparatus and methods. One such method suited for use with burst mode signals generates a recovered clock more quickly than other methods in the prior art. This method is the subject of U.S. Pat. No. 5,237,290, issued on Aug. 17, 1993 to Mihai Banu et. al., which is hereby incorporated by reference herein in its entirety. Specifically, according to the '290 patent, the transmitter clock is recovered with a bounded phase relationship with respect to the incoming data signal. Thus, the recovered transmitter clock and the incoming data signal will have the same frequency and their relative phase will remain within a given range.

In another prior attempt, described in U.S. Pat. No. 5,757,872, issued on May 26, 1998 also to Mihai Banu et. al., a FIFO buffer was incorporated into the method of the '290 patent in order to prevent the loss of data that could result from the potential lack of synchronization between the local receiver clock and the recovered transmitter clock.

However, while the prior methods such as those disclosed in the '290 patent and the '872 patent provide a method of accurately recovering the transmitted clock and data, the clock information was only used to assist the receiver in capturing and correlating the incoming data for further transmission within the network.

SUMMARY OF THE INVENTION

We have discovered that, in addition to using the recovered transmitter clock to capture and align the words of an incoming data stream, it is advantageous to accurately measure and capture the phase difference between an incoming data word from an individual transmitter and the local receiver clock. The difference is measured in the word alignment circuitry by determining the offset of the data word as positioned in at least a first register of the word circuitry. This offset is measured by determining the difference between a) the location of a first available position within a first data register and b) that position of a selected bit of the data word within that data register or within an adjacent data register. Since each bit position within the register is filled sequentially at a known fraction of a clock frequency, offset within the register is equal to the phase difference between the recovered transmitter clock associated with a data word and the receiver clock.

It is also advantageous to measure the time delay in an elastic storage buffer experienced by a particular data word from an individual transmitter. In a first embodiment, the delay within an elastic storage buffer is determined by measuring the difference in the position of two memory pointers, one of which is associated with the first data word written to the FIFO, and the other pointing to the first available location in the FIFO. The difference in the location of the pointers is determined by a subtractor circuit. In a second embodiment, a timestamp on each data word may be used to determine the difference between the time when a word is written to the FIFO and the time when a word is read from the FIFO.

Once measured, the aforementioned phase difference and time delay are used to time the transmission of data from individual transmitters in the network with a maximum efficiency while, at the same time, preventing conflicts between successive data words transmitted by different transmitters.

DETAILED DESCRIPTION OF THE INVENTION

Figure 1A:
FIG. 1A shows a generic digital communication network.

FIG. 1A shows an illustrative communications network having a transmitter 101, a communication medium 102, and a receiver 103, connected as shown in the FIG. 1. Data 104 are outputted by the transmitter 101 into the communication medium 102 and is carried by medium 102 to receiver 103 as input data stream 105. The receiver 103 decodes input data stream 105 to produce output 108, which comprises an output data word stream supplemented with timing information.

Figure 1B:
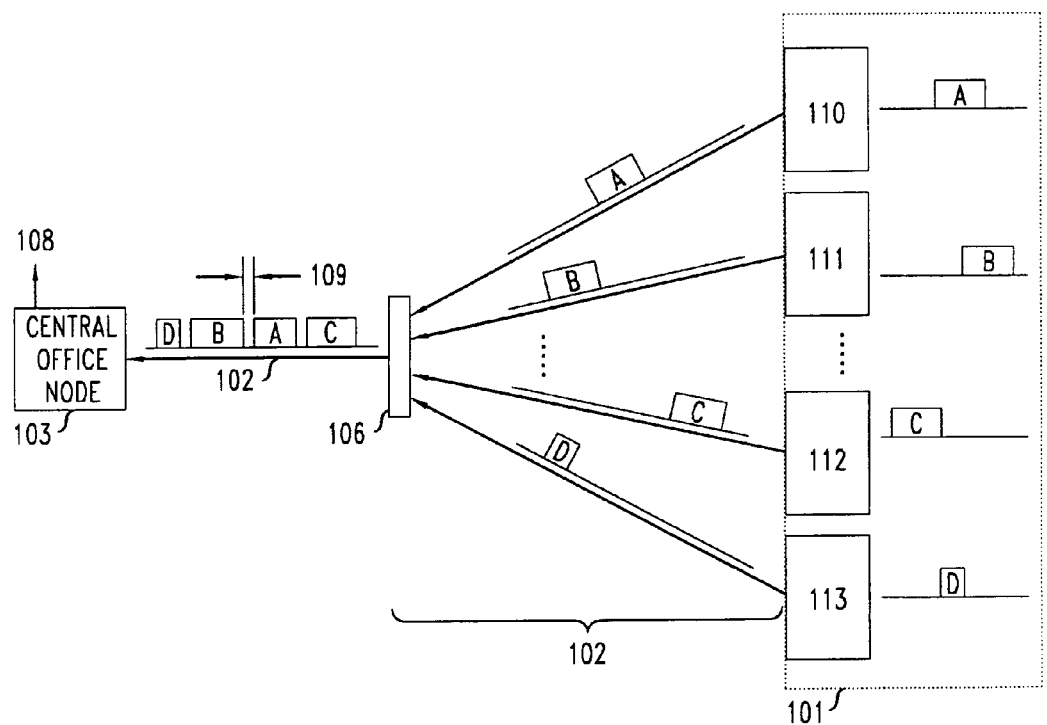
FIG. 1B shows a passive optical fiber time division multiple access communication network.

FIG. 1B shows more specific illustrative communications network, namely a time-division multiple access (TDMA) passive optical communication network (PON) having multiple user transmitter nodes 110–113, within a group of transmitters 101, transmitting and receiving data from a central office node 103. While a TDMA PON is one representative example, one skilled in the art will recognize that the principles of the present invention may be applied to any network with one or more transmitter nodes that requires accurate timing information for use in scheduling or for other purposes. Referring to FIG. 1B, transmitter nodes 110–113 are connected by optical fiber link 102 to central office node 103 through illustrative optical power splitter 106. It will be apparent to one skilled in the art that other suitable communications mediums, such as electrical wires, are equally advantageous.

The equipment in the central office 103 is comprised of, in part, a scheduler and timing circuitry for scheduling transmission from the transmitters 110–113, an optical receiver with a burst mode clock data recovery circuit for receiving incoming optical signals and recovering the transmitted clock and data, and an optical transmitter for transmitting optical signals to the transmitters 110–113 and other network nodes. The timing circuitry passes timing data to the scheduler that, in turn, assigns timeslots to the transmitters 110–113 such that the different blocks of user data are separated in time by, for example, guard band 109 to avoid interference when they reach the optical receiver at the central office 103. This ensures, for example, that the end of the transmission A from transmitter 110 does not interfere with the beginning of the transmission B from transmitter 111. Maximum efficiency is achieved when the guard band is as narrow as possible. It follows that, when the timing is more accurately known, the guard band can be decreased.

Figure 2:
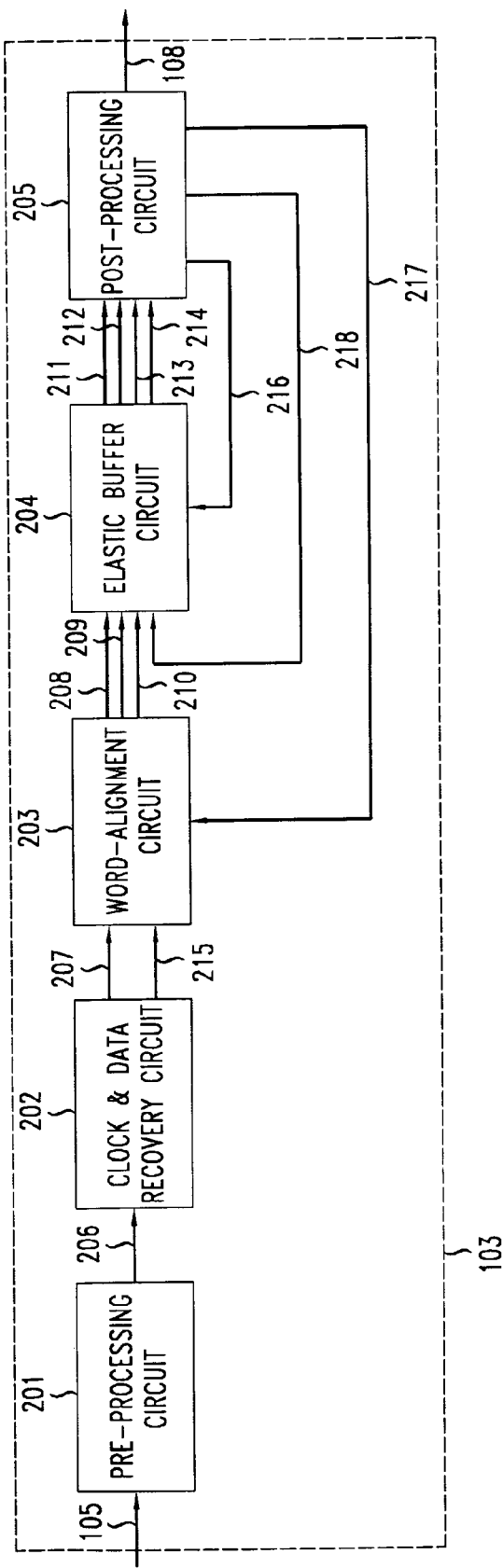
FIG. 2 shows the components of the receiver of the network of FIG. 1B.

FIG. 2 shows an expanded view of the receiver 103 of FIG. 1 and the functional circuits contained therein. This circuitry is, in part, comprised of a preprocessing circuit 201, a clock and data recovery circuit 202, a word alignment circuit 203, an elastic buffer circuit 204 and a post-processing circuit 205. The preprocessing circuit 201 accepts the input data stream 105 from the transmission medium and produces data signal 206. The data signal 206 is input into the clock and data recovery circuit 202 that produces the recovered transmitted clock signal 215 and the recovered data signal 207. An illustrative example of the clock and data recovery circuit 202 is described in U.S. Pat. No. 5,757,872, which is incorporated by reference in its entirety as previously set forth hereinabove. As discussed above, and as is well known in the art, the clock and data recovery circuit 202 recovers the transmitter clock with a bounded phase relationship with respect to the incoming data signal. Thus, the recovered transmitter clock and the incoming data signal will have the same frequency and their relative phase will remain within a given range.

Figure 3:
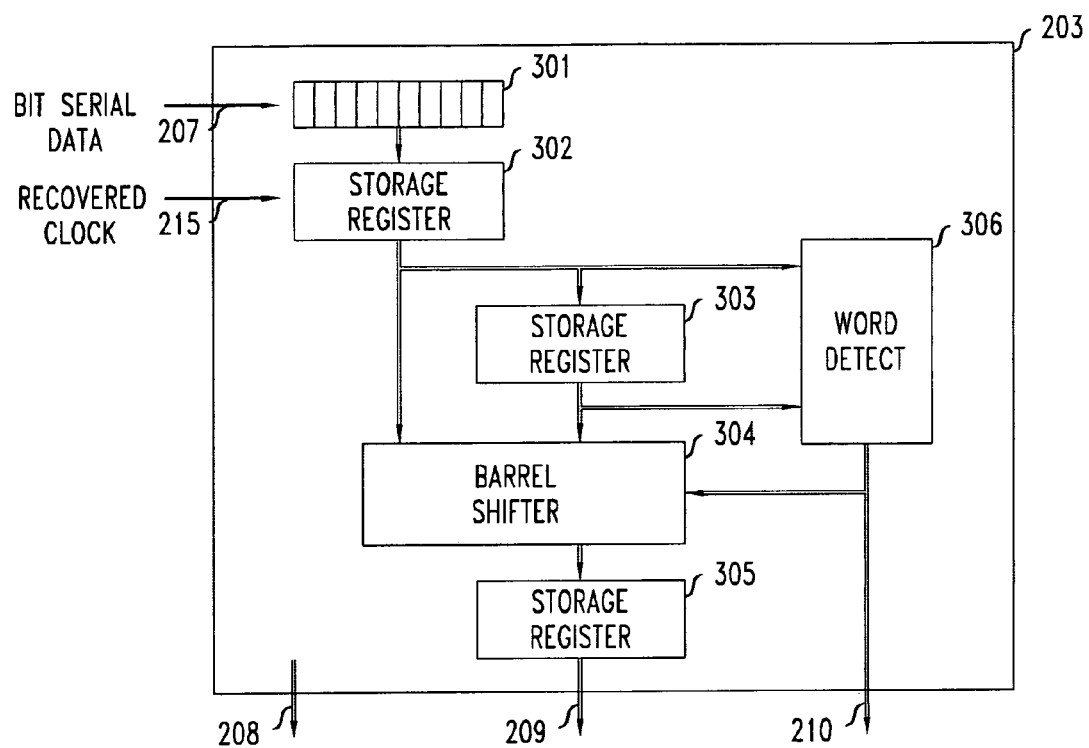
FIG. 3 shows the word alignment unit of the receiver of FIG. 2.

Once the transmitted clock is recovered, the serial data signal 207 and the recovered clock signal 215 are transmitted to the word alignment circuit 203. The word alignment circuit 203 uses a detection method to reconstruct the incoming words of the incoming data stream 207. FIG. 3 shows one illustrative embodiment of a word alignment circuit 203 wherein a particular number of bits in a bit serial data stream 207, corresponding to the known word length used in the data stream, is transferred into a shift register 301 at the clock rate of the recovered transmitter clock. Illustratively, the word length is 10 bits and the local receiver clock rate is 1.25 GHz. One skilled in the art will recognize that many different word lengths and clock rates are equally advantageous. The data entered into the shift register 301 may consist of the bits of a single word or, alternatively, may consist of bits from two different words. Once these data are entered into the shift register 301, it is then transferred at a lower clock rate into a first storage register 302 at the same time the data in the first storage register 301 is copied into a second storage register 303. This clock rate is, advantageously, the clock rate determined by the following relationship:

$$f_{word} = \frac{f_{bits}}{W} \quad \text{(Equation 1)}$$

where $f_{word}$ is the frequency at which the data are shifted from the shift register 301 into the first storage register 302, $f_{bits}$ is the frequency at which the data are entered into the shift register 301, and W is the data word length. Thus, according to the relationship in Equation 1, assuming the illustrative $f_{bits}$ of 1.25 GHz and a data word length of 10 bits, $f_{word}$ will be 125 MHz. It follows that, if the receiver clock is aligned in phase with the incoming data word, as soon as one complete 10-bit word is entered into the shift register 301 (10 clock cycles at 1.25 GHz), that word will be transferred into the first storage register 302.

Figure 5:
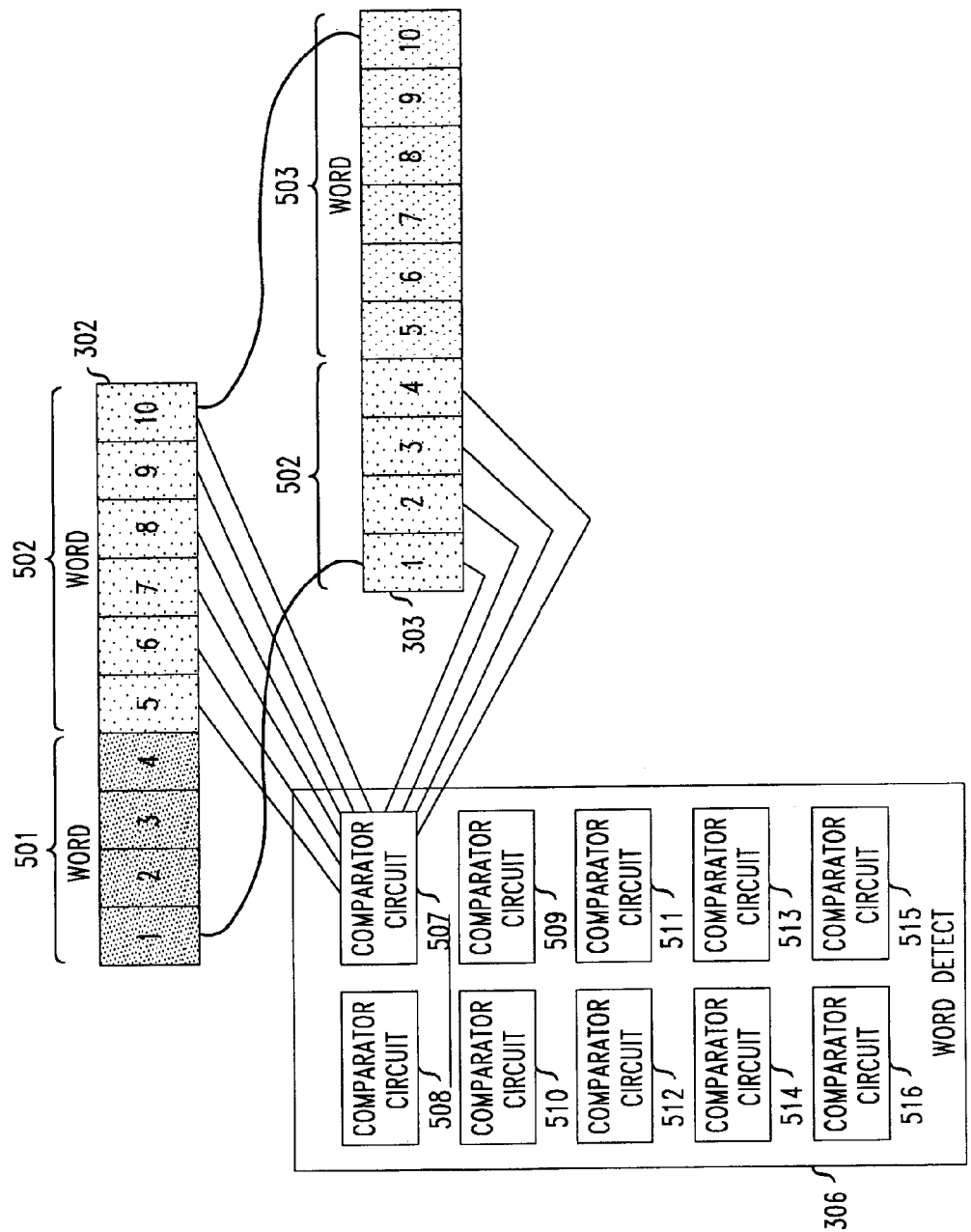
FIG. 5 shows the memory registers of the word alignment unit of FIG. 3.

Thus two word-length sets of data are stored, one set in the second storage register 303 and one set in the first storage register 302. If the receiver clock is aligned in phase with the incoming data word, the first storage register 302 and the second storage register 303 will each hold a single complete word of, in this illustrative example, 10 bits. However, if there is a phase difference between the receiver clock and the incoming data word, data in the shift register 301 will not be transferred into the first register 302 as a complete word. Instead, the first and second storage registers will each contain portions of two different words. For example, FIG. 5 shows the two storage registers, 302 and 303 of FIG. 3, in an illustrative example showing how portions of words can be contained within those registers when the clocks are out of phase with respect to one another. Specifically, in this illustrative example, the data from the shift register, 301 in FIG. 3 are transferred in an out-of-phase manner into the first storage register 302. It follows that, after two successive transfers of incoming word-length sets, register 303 will contain a portion of word 503 and the first serial portion of word 502. Similarly, register 302 will contain the second portion of word 502 and the first portion of word 501.

Thus, in order to route the complete incoming words to their intended destination when the transmitter clock and receiver clock are out of phase, it is necessary to reconstruct, or align, the bits of the complete words such as, for example, word 502 in FIG. 5. Referring once again to FIG. 3, this reconstruction (or word alignment) function is accomplished by shifter 304 which is, illustratively a well-known barrel shifter. This barrel shifter 304 utilizes a well-known word detection scheme to reposition the bits of a word within storage registers 302 and 303. One method of detecting this position is to detect a known calibration pattern that is transmitted in the data stream for this purpose. One skilled in the art will recognize that there are advantageous methods used in other implementations for detecting the position of the bits of words relative to the storage registers and reconstructing those words.

Illustratively, referring once again to FIG. 5, comparator circuits 507–516 within the word detection circuitry 306 of FIG. 3, are used for this purpose. Specifically, each of comparator circuits 507–516 is connected to a different sequence of bit locations in registers 302 and 303. Specifically, a sufficient number of comparator circuits 507–516 are used such that each possible word location corresponds to an individual comparator circuit. Each comparator circuit detects the bits in the bit locations within the two registers 504 and 505 to which it is connected. When word alignment is required and the calibration pattern is detected, the offset between the actual position of the bits of the calibration pattern relative to the desired position in the storage register 301 in FIG. 3 is measured.

The desired position of word 502 is, illustratively, when the first bit of word 502 (shown in position 4 of register 303) is in position 10 in register 302. Thus, the last bit of that word (shown in position 5 of register 302) would be in position 1 of register 302. In the example of FIG. 5, however, word 502 (which is, for example, the calibration word) is not in this location. Specifically, in this case, comparator circuit 507, which is connected to positions 5–10 of register 4 and to positions 1–4 of register 505, would detect the calibration pattern. Thus, as previously discussed, the bits of the data word 502 were entered into the shift register serially at a 1.25 GHz clock rate, but the 125 MHz clock governing the register 302 in FIG. 3 was out of phase relative to the incoming data word by the equivalent of five cycles of that higher rate clock. This phase difference, representative of the positional offset of the word from its desired location, is measured and output in signal 210 to an elastic storage unit, such as the FIFO of FIG. 4, as described herein below. This phase difference is then transmitted to the aforementioned timing circuitry associated with the scheduler of the central office 103 in FIG. 1B. The scheduler then compensates for this phase difference by adjusting future scheduled transmissions from the individual transmitters 110–113.

Once this phase difference/offset has been measured, barrel shifter 304 in FIG. 3 which is, once again, well known in the art, reconstructs the complete word from its bit-positions in registers 302 and 303 and stores the word in a third register 305. This word is then transmitted via signal 209, in accordance with the timing of the FIFO clock signal 210, to the aforementioned FIFO.

Figure 4:
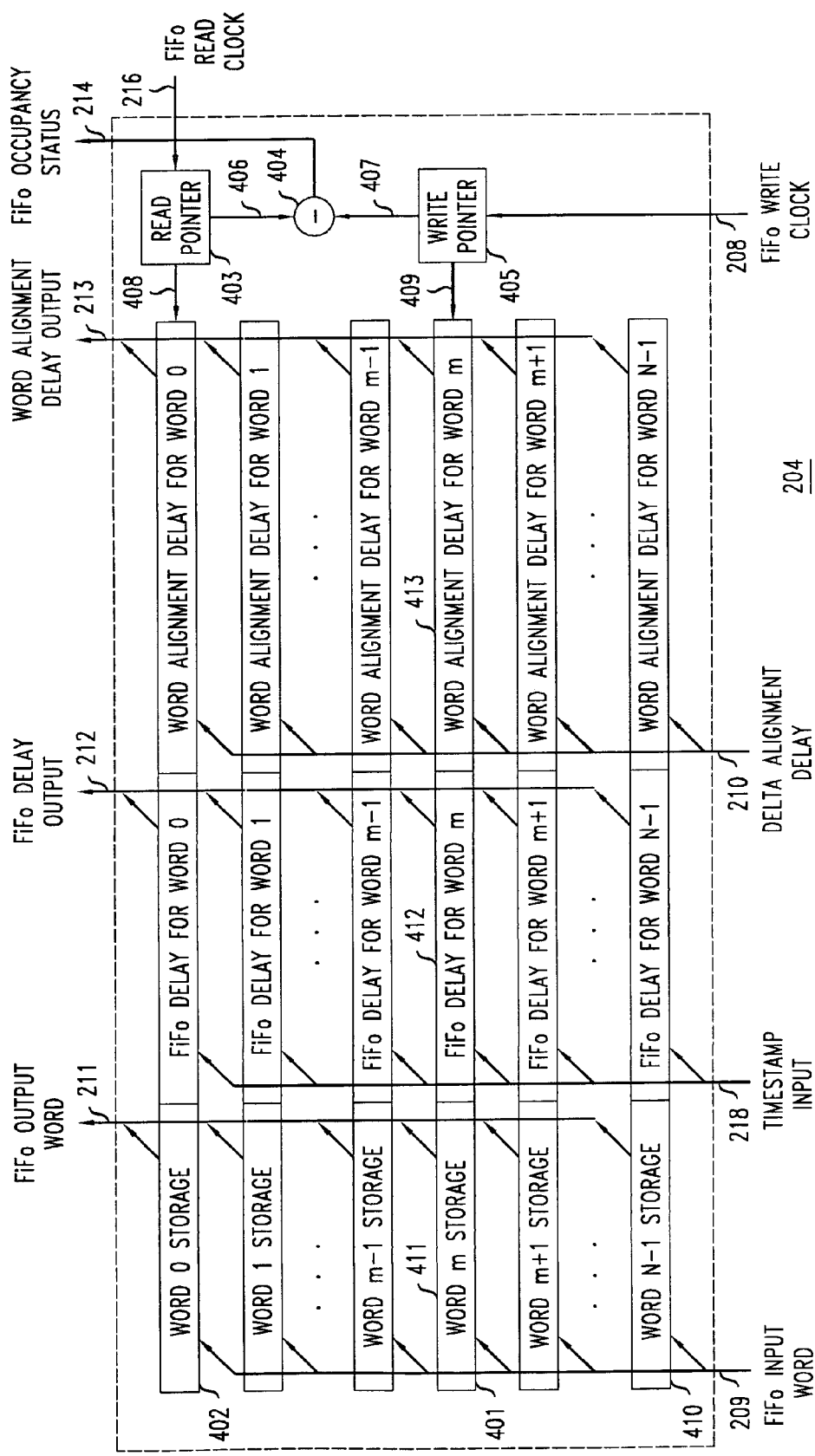
FIG. 4 shows the elastic storage unit/FIFO of the receiver of FIG. 2.

FIG. 4 shows an elastic storage unit in accordance with the principles of one embodiment of the present invention, more specifically a FIFO 204. FIFOs such as FIFO 204, are generally well-known in the art. However, the FIFO of FIG. 4 is unique in data networking in that, unlike any such prior FIFOs, FIFO delay and word alignment delay for each data word are stored in registers within the FIFO that correspond to the data word. FIFO 204 is comprised of a number of equal registers, such as register 401. Each of the registers has, illustratively, three fields. The first field 411 in register 401 stores the data word transmitted in signal 209 from the word alignment unit of FIG. 3; the second field 412 stores the FIFO delay corresponding to the data word; and the third field 413 stores the word alignment delay measured by the word alignment unit of FIG. 3 and transmitted via signal 210. One skilled in the art will recognize that, in some systems wherein word alignment delay and/or FIFO delay is relatively constant, an alternative embodiment of the FIFO that includes only a single register for storage of that word alignment delay and/or FIFO delay may be equally advantageous.

Read pointer 403 and the write pointer 405 indicate the register into or from which data are being read from or written to, respectively, at that particular point in time. Pointers 403 and 405 move vertically relative to the registers, including registers 401, 402 and 410, in order to point to that register where data are being read from or written to, respectively. Arithmetic subtractor circuit 404 determines the difference between the relative positions of the write pointer and the read pointer. The result corresponds to the latency of a data word in the FIFO 204 prior to being read. Thus, this difference is a direct measurement of the delay experienced as a result of using the FIFO 204.

Alternatively, to calculate the latency of a data word in the FIFO 204, the subtractor circuit or an external circuit could be used to determine the difference between a timestamp corresponding to each data word as it is read and the current time. The timestamp is a copy of the status of a reference counter which is assigned to a data word via input 218 at the time this word is written to the FIFO 204.

The writing of logic values of inputs 209, 218 and 210 to one of the FIFO registers, such as register 401 is triggered by the write clock input signal 208. The register to be written to, in this case register 401, is selected by the write pointer 405 generating the write enable signal 409 to register 401. Simultaneously with writing values of inputs 209, 218 and 210 to register 401, the write pointer 405 updates its value. The write pointer 405 keeps the same value when no registers in the FIFO 204 are being written to. When the value of the write pointer 405 is to be updated and the current value of the write pointer 405 corresponds to any register other than the last register 410, the new write pointer value is obtained by increasing its current value by one. When the current value of the write pointer 405 corresponds to the last register 410, the new value of the updated write pointer 405 is the one that points to the first register 402.

Reading logic values from, for example, register 402 is triggered by the read clock signal 216. The register to be read from (402 in this example) is selected by the read pointer 403 generating the read enable signal 408 to register 402. Simultaneously with making the contents of register 402 available at outputs 211, 212 and 213 for transmission to post processing circuit 205 in FIG. 5, the read pointer 403 updates its value. The read pointer 403 keeps the same value when no registers in the FIFO 204 are read from. When the value of the read pointer 403 is to be updated and the current value of the read pointer 403 selects any register other than the last register 410, the new value is obtained by increasing its current value by one. When the value of the read pointer 403 is to be updated and the current value of the read pointer 403 selects the last register 410, the new value is the one that points to the first register 402.

As discussed above, in one illustrative embodiment, the subtractor circuit 404 performs arithmetic subtraction of the value of the write pointer 405 from the value of the read pointer 403. If the result is positive or zero it is presented to the output 214. If the result is negative, the subtractor circuit 404 makes a correction of this result by adding the total number of registers to the result and presents the new value to the output 214. The value output at output 214 is representative of the total delay of a data word attributable to FIFO 204 processing.

As previously discussed, FIFO 204 outputs to the illustrative post-processing circuit 205 in FIG. 2 the data word 211, the word alignment delay 213, the FIFO latency 214 calculated from subtractor circuit 404 and, optionally, the FIFO delay 212 calculated as the difference between the timestamps on the word being read out from the FIFO 204 and the current time. One skilled in the art will recognize that outputs 212 and 214 are somewhat redundant and, therefore, a particular embodiment may illustratively only use one of the outputs 212 or 214.

The FIFO delay, calculated as described above, is transmitted to the aforementioned timing circuitry associated with the scheduler in the central office 103 in FIG. 1B. The scheduler then uses this delay information to schedule future transmissions from the individual transmitters 110–113.

Figure 6:
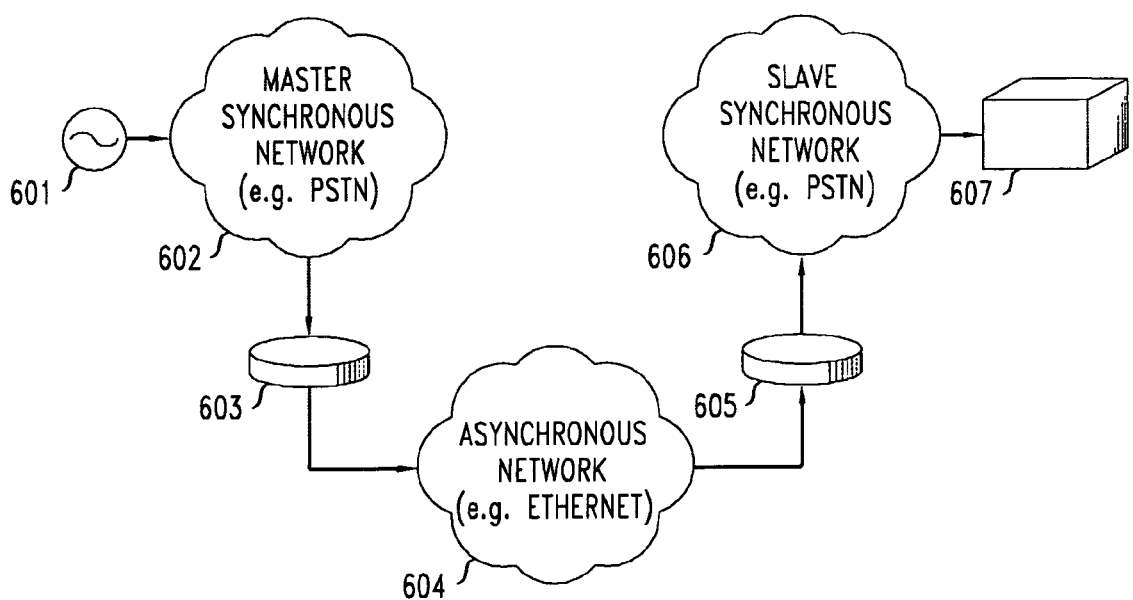
FIG. 6 shows a communication network wherein accurate time information is used to synchronize different portions of the network.

The foregoing describes an illustrative embodiment wherein accurate time information is used by a scheduler in a communication network to increase the efficiency of network transmissions. Another type of system in which accurate time information is required is illustrative shown in FIG. 6. Specifically, FIG. 6 shows a system that relies on synchronous circuit emulation over asynchronous packet-switched networks. Two synchronous networks 602 and 606, for example public switched telephone networks (PSTN), are interconnected over an asynchronous transport network, for example an Ethernet network 604 using adapter systems 603 and 605. In synchronous networks, all equipment that constitutes such a network must operate clocks that are synchronized in frequency. Typically, a synchronous network comprises one or a small number of highly accurate primary clock sources 601, such as atomic clocks and all other equipment synchronizes to its local clock to said primary reference source using a hierarchical distribution path. If a segment of a synchronous network is connected to the rest of a network though an asynchronous network only, such as when segment 606 is connected to segment 602 though network 604, there are no means for directly transporting clock indications from one network to the other. In such cases, special methods and systems must be developed to synchronize said two segments of the synchronous networks. Adapter systems 603 and 605 implement this function.

Using these adapters, the aforementioned synchronization is achieved by using packet arrival events at the adapter 605 as clock indications. Since packet departures at adapter system 603 are deterministic and synchronous to the clock in network 602, processing the packet arrival events at adapter 605, so that the effects of the jitter introduced by asynchronous network 604 is removed can be used to implement the synchronization method. Better accuracy and faster convergence will result if the packet arrival events are measured with higher precision.

The highest possible measurement precision of packet arrival times is within the accuracy of one bit time. Using the accurate timing method of the present invention simplifies the implementation of a system that measures the packet arrival times with bit granularity by minimizing the amount of circuitry that runs at the high-speed bit-clock. The circuit that implements the present invention allows for using the parallel interface of the receiver 103 to detect packet arrivals followed by using the delta-alignment delay signal and the signal representing the number of entries in the FIFO to reconstruct the original arrival time at the serial side of the receiver. Said reconstruction circuitry operates at the frequency which is W times lower than the bit rate of the receiver, where W is the word length at the parallel interface of the receiver.

The foregoing merely illustrates the principles of the invention. It will thus be appreciated that those skilled in the art will be able to devise various arrangements which, although not explicitly described or shown herein, embody the principles of the invention and are within its spirit and scope. Furthermore, all examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. A method for use in timing the transmission of data comprising:
   receiving a signal indicative of the phase difference between a receiver clock and a data word, wherein said phase difference is measured by a word alignment circuit such that said word alignment circuit determines an offset of said data word as positioned in at least a first data register of said word alignment circuit, said offset being a function of a difference between (a) a location of a first available position within said first data register; and (b) a position of a selected bit of said data word within said first data register or an adjacent data register thereto; and
   using said signal to schedule at least a first data transmission.

2. A method for use in timing the transmission of data from one or more transmitters, said method comprising:
   measuring a phase difference between an incoming data word from a particular one transmitter and a receiver clock, said phase difference being measured by performing the further operations of:

determining, using a word alignment circuit, an offset of said incoming data word as positioned in at least a first data register of said word alignment circuit, said offset being a function of a difference between (a) a location of a first available position within said first data register; and (b) a position of a selected bit of said incoming data word within said first data register or an adjacent data register thereto; and measuring, within an elastic storage buffer, a time delay experienced by said incoming data word from said particular one transmitter, said time delay within said elastic storage buffer being determined by performing the further operations of:

measuring a difference in a position of a first memory pointer and a second memory pointer, said first memory pointer being associated with a particular data word written to said elastic storage buffer, and said second memory pointer pointing to a first available location in said elastic storage buffer; and using said phase difference and said time delay to schedule at least a first data transmission.

3. The method of claim 2 wherein said elastic storage buffer is a First in First Out (FIFO).

4. The method of claim 3 wherein said FIFO stores a FIFO delay and a word alignment delay for each data word stored in a plurality of registers within said FIFO that correspond to each said data word.

5. The method of claim 2 wherein utilization of said phase difference and said time delay prevents conflicts between successive data words transmitted by different ones of said transmitters.

6. A method for use in a receiver comprising:

determining a phase difference between a receiver clock and a data word, said phase difference being determined using a word alignment circuit associated with said receiver and as function of an offset of said data word as positioned in at least a first data register of said word alignment circuit, said offset being a function of a difference between (a) a location of a first available position within said first data register; and (b) a position of a selected bit of said data word within said first data register or an adjacent data register thereto; and generating a signal indicative of said phase difference.

7. A receiver comprising:

a word alignment circuit for measuring a phase difference by determining an offset of an incoming data word as positioned in at least a first data register of said word alignment circuit, said offset being a function of a difference between (a) a location of a first available position within said first data register; and (b) a position of a selected bit of said incoming data word within said first data register or an adjacent data register thereto; and wherein said phase difference is used to produce a signal that is operative to time at least a first transmission of data to said receiver.

8. The receiver of claim 7 further comprising:

an elastic storage buffer for measuring a time delay experienced by said incoming data word from said transmitter, said time delay within said elastic storage buffer being determined by measuring a difference in a position of a first memory pointer and a second memory pointer, said first memory pointer being associated with a particular data word written to said elastic storage buffer, and said second memory pointer pointing to a first available location in said elastic storage buffer; and wherein said phase difference is used to produce said signal operative to time said at least first transmission of data to said receiver.

9. The receiver of claim 8 wherein said elastic storage buffer is a First in First Out (FIFO).

10. The receiver of claim 9 wherein said FIFO stores a FIFO delay and a word alignment delay for each data word stored in a plurality of registers within said FIFO that correspond to each said data word.

* * * * *